US008291056B2

(12) United States Patent
Devarakonda et al.

(10) Patent No.: US 8,291,056 B2
(45) Date of Patent: *Oct. 16, 2012

(54) METHOD AND APPARATUS FOR PERFORMANCE AND POLICY ANALYSIS IN DISTRIBUTED COMPUTING SYSTEMS

(75) Inventors: Murthy V. Devarakonda, Peekskill, NY (US); Nithya Rajamani, Tarrytown, NY (US); Mudhakar Srivatsa, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 811 days.

This patent is subject to a terminal disclaimer.

(21) Appl. No.: 12/165,029

(22) Filed: Jun. 30, 2008

(65) Prior Publication Data
US 2008/0262817 A1 Oct. 23, 2008

Related U.S. Application Data

(63) Continuation of application No. 11/258,435, filed on Oct. 25, 2005, now Pat. No. 7,702,788.

(51) Int. Cl.
G06F 15/173 (2006.01)

(52) U.S. Cl. ........ 709/223; 709/201; 709/225; 709/226; 709/229

(58) Field of Classification Search .................. 709/201, 709/223, 225, 226, 229
See application file for complete search history.

(56) References Cited

U.S. PATENT DOCUMENTS

| 5,031,089 | A | | 7/1991 | Liu et al. |
| 5,276,877 | A | | 1/1994 | Friedrich et al. |
| 5,583,792 | A | * | 12/1996 | Li et al. ......................... 709/224 |
| 6,067,412 | A | | 5/2000 | Blake et al. |
| 7,454,427 | B2 | | 11/2008 | Jackson |
| 7,490,122 | B2 | | 2/2009 | Horvitz et al. |
| 7,590,739 | B2 | | 9/2009 | Swildens |
| 7,603,372 | B1 | * | 10/2009 | Honicky et al. ...................... 1/1 |
| 7,684,964 | B2 | * | 3/2010 | Outhred et al. .................. 703/2 |
| 7,685,281 | B1 | * | 3/2010 | Saraiya et al. ................ 709/226 |
| 7,689,676 | B2 | * | 3/2010 | Vinberg et al. ................ 709/220 |
| 2003/0187709 | A1 | * | 10/2003 | Brodsky et al. .................. 705/7 |
| 2005/0086335 | A1 | * | 4/2005 | Liu et al. ........................ 709/223 |
| 2005/0138167 | A1 | | 6/2005 | Whitman, Jr. |
| 2005/0228856 | A1 | | 10/2005 | Swildens |
| 2006/0025985 | A1 | * | 2/2006 | Vinberg et al. ................. 703/22 |
| 2007/0006177 | A1 | * | 1/2007 | Aiber et al. .................... 717/136 |
| 2009/0204245 | A1 | * | 8/2009 | Sustaeta et al. ................ 700/99 |

OTHER PUBLICATIONS

Peter J. Denning and Jeffrey P. Buzen, "The Operational Analysis of Queueing Network Models", 1978, ACM 0010-4892/78/0900-0225.
Olivia Das and Murray Woodside, "The Fault-Tolerant Layered Queueing Network Model for Performability of Distributed Systems", Computer Performance and Dependability Symposium, IPDS 1998, IEEE, pp. 132-141.
Johannes Luthi, "Interval Matrices for the Bottleneck Analysis of Queueing Network Models with Histogram-Based Parameters", Computer Performance and Dependability Symposium, IPDS, 1998, pp. 142-151.

* cited by examiner

Primary Examiner — Yasin Barqadle
Assistant Examiner — Van Kim T Nguyen
(74) Attorney, Agent, or Firm — Louis J. Percello

(57) ABSTRACT

One embodiment of the present method and apparatus for performance and policy analysis in distributed computing systems includes representing a distributed computing system as a state transition model. A queuing network is then superimposed upon the state transition model, and the effects of one or more policies on the distributed computing system performance are identified in accordance with a solution to the queuing network.

16 Claims, 5 Drawing Sheets

METHOD AND APPARATUS FOR PERFORMANCE AND POLICY ANALYSIS IN DISTRIBUTED COMPUTING SYSTEMS

CROSS REFERENCE TO RELATED APPLICATIONS

This application is a continuation of U.S. patent application Ser. No. 11/258,435, filed Oct. 25, 2005 now U.S. Pat. No. 7,702,788, entitled "METHOD AND APPARATUS FOR PERFORMANCE AND POLICY ANALYSIS IN DISTRIBUTED COMPUTING SYSTEMS", which is herein incorporated by reference in its entirety.

FIELD OF THE INVENTION

The present invention relates generally to computing systems and relates more particularly to policy analysis for distributed computing systems in which multiple computing sites share resources.

BACKGROUND

FIG. 1 is a schematic diagram illustrating a typical distributed computing network or system 100. The system 100 comprises a plurality of communicatively coupled computing sites $102_1$-$102_n$ (hereinafter collectively referred to as "sites 102") that each host one or more applications. Each site 102 has access to a respective plurality of local resources (e.g., servers, processors, storage, etc.) $104_1$-$104_n$ (hereinafter collectively referred to as "resources 104"). In addition, each of the sites 102 receives a respective workload $106_1$-$106_n$ (hereinafter collectively referred to as "workloads 106") comprising requests to applications that run on the sites 102.

Sites 102 employ their respective local resources 104 to satisfy their respective workloads 106. In addition, in a distributed computing system such as the system 100, communicatively coupled sites 102 may share their respective resources 104 with other sites 102, so that a site 102 may borrow resources 104 from a remote site 102 in order to efficiently process its workload 106, or the site 102 may lend its resources 104 to a remote site 102 to assist the remote site 102 in its workload processing. Each site 102 has its own set of policies governing how, when and to/from where the site 102 may lend or borrow resources 104.

These individual policies greatly impact the ability of the overall system 100 to efficiently process workloads 106. However, because such policies vary from site to site, the effects of these policies on the overall system 100 and its ability to process workloads 106 are difficult to quantify.

Thus, there is a need in the art for a method and apparatus for performance and policy analysis in distributed computing systems.

SUMMARY OF THE INVENTION

One embodiment of the present method and apparatus for performance and policy analysis in distributed computing systems includes representing a distributed computing system performance as a state transition model. A queuing network is then superimposed upon the state transition model, and the effects of one or more policies on the distributed computing system are identified in accordance with a solution to the queuing network.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for performance and policy analysis in distributed computing systems. Embodiments of the present invention make it possible to efficiently analyze the effects of various resource sharing policies, applicable to individual computing sites, on the performance of an overall distributed computing system including the computing sites.

Figure 1:
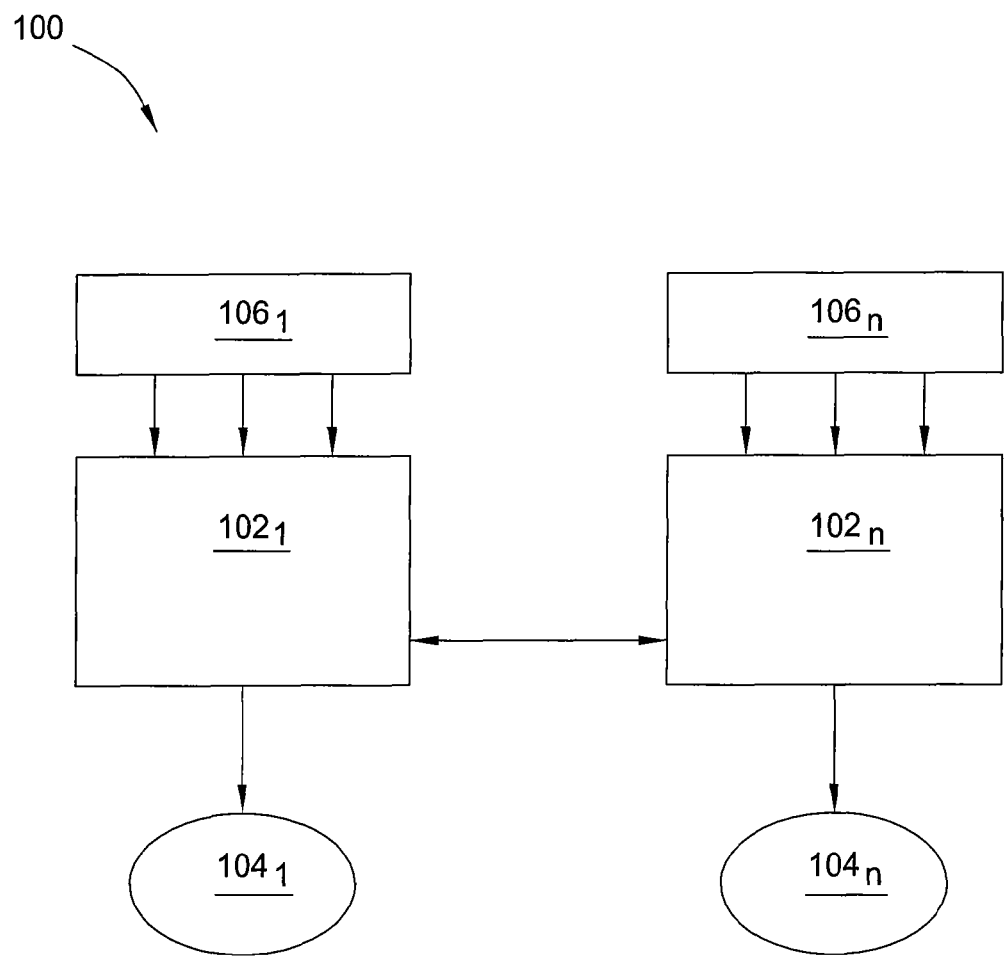
FIG. 1 is a schematic diagram illustrating a typical distributed computing network or system.
Figure 2:
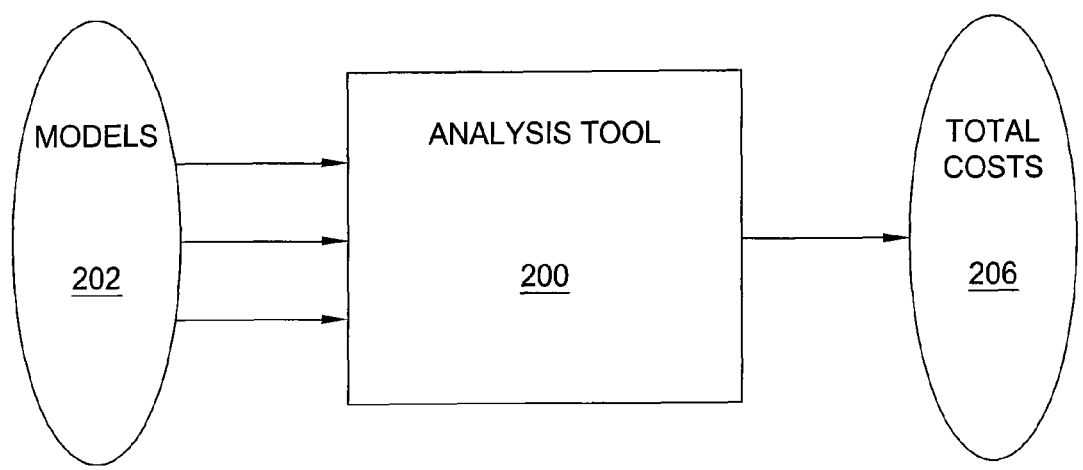
FIG. 2 is a schematic diagram illustrating one embodiment of an analysis tool for analyzing a collection of resource sharing policies associated with a distributed computing system, according to the present invention.

FIG. 2 is a schematic diagram illustrating one embodiment of an analysis tool 200 for analyzing a collection of resource sharing policies associated with a distributed computing system, according to the present invention. As illustrated, the analysis tool 200 is adapted to receive a plurality of inputs related to the distributed computing system and process these inputs in order to provide information from which a user can determine whether existing resource-sharing policies associated with the distributed computing system are acceptable.

In the embodiment illustrated, the inputs received by the analysis tool 200 comprise a plurality of models 202 relating to characteristics of the distributed computing system and/or sites. In one embodiment, these models 202 comprise, for each computing site in the distributed computing system, at least on of: a site model, a workload model, a workload state model, a site state model, an event model or a cost model. In addition, a policy model applying to the overall distributed computing system that includes the computing sites is also provided to the analysis tool 202. The analysis tool 200 processes these inputs to produce one or more metrics 206 associated with the performance of the distributed computing system. In one embodiment, these metrics include the costs of implementing specified policies, as discussed in greater detail below, and may additionally include one or more system performance metrics (e.g., reflecting the response time, throughput, resource availability, etc. of the distributed computing system).

The site model describes static (e.g., not tied to workload state changes) parameters of a site and as such comprises, in one embodiment, an array of <ns, pt> tuples representing a site, where ns denotes the number of resources of pool type pt.

Those skilled in the art will appreciate that although the parameters described by the site model may be considered "static" relative to workload state changes, they may vary somewhat as the associated site gains or loses resources. In one embodiment, each pool comprises a plurality of resources. All resources belonging to a common pool are substantially homogeneous in that any of them can run a given application. For example, in one embodiment, resources are grouped into pools based on one or more criteria including at least one of: server hardware, operating system and software stack. In addition, the site model includes a policy set p that describes specific policies (e.g., resource-sharing policies) associated with the site.

The workload model represents applications hosted by a site, as well as any service level agreements (SLAs) that explicitly specify guarantees (including the cost of violating those guarantees) provided by the site to the clients (e.g., users that provide the workloads) served by the site. Each workload draws its resources from at least one resource pool type pt. At any given time, each workload is at one of n levels. Each of these levels is in turn mapped to certain resources (e.g., a certain number of servers) required to process the associated workload satisfactorily according to its SLA.

Additionally, the workload model represents an n×n transition probability matrix tpm that specifies how the associated workload transits between levels, where tpm(i,j) specifies the probability that a workload transits from level i to level j ($1 \leq i,j \leq n$). The distribution of the amount of time that a given workload remains at level i is assumed to be known. In one embodiment, this distribution is an exponential distribution or a Pareto distribution.

The workload state model is, in one embodiment, represented as <lv, nl, nb>, where lv denotes the current workload level (e.g., as described by the workload model discussed above), nl denotes the local resources (e.g., number of servers) that are currently serving the workload and nb is an array (one element per remote site) that denotes the resources (e.g., number of servers) borrowed from other sites on behalf of the workload. In one embodiment, all of the resources, local and remote, that are currently serving the workload belong to a common pool type pt as required by the workload.

The site state model represents the current state of the associated site, where a site's "state" defines the availability of the site's local resources. Thus, in contrast to the site model, which describes static parameters associated with a site, the associated site state model represents time-varying parameters associated with the site. In one embodiment, the site's state is represented as <ws, nd, as>, where ws is an array of local workload states, nd is an array (one element per remote workload) that denotes the resources (e.g., number of servers) donated by the site to a remote workload at another site, and as is an array (one element per pool type pt) of active resources (e.g., servers) that denotes the local resources that are in active mode, where resources in active mode are those resources that are currently able to service workloads.

The policy model represents the ways in which the distributed computing system may respond to system events. In one embodiment, the policy model is represented as P(S, e), where P is a set or collection of policies that apply to the system (e.g., via the individual sites included in the system), S denotes the current state (e.g., resource availability) of the distributed computing system, and e is an external event that invokes one or more of the policies in the set P (e.g., a workload event or a server event as discussed in greater detail below). When such an external event e occurs while the system is in state S, the policy set P is applied in order to guide the system to a collection of potential new states, all of which conform to the policy set. For example, when the current system state is S on an external event e, the policy set P is applied such that $\{(S1, p1), (S2, p2), \ldots, (Sn, pn)\}$, where Si ($1 \leq i \leq n$) is a valid next state in accordance with the policy set P and pi is the probability with which the system is recommended to transit to the state Si and $\Sigma i=1 \, npi=1$.

Note that if n=1, then there is only one next state that conforms to the policy set P. Alternatively, if n>1, the system chooses the next state probabilistically from the set $\{Si: 1 \leq i \leq n\}$. The policy model is general and can accommodate a large spectrum of policies for distributed computing.

The event model represents events or external changes that trigger state changes, thus requiring the system to reallocate or redistribute system resources among system workloads in order to meet system business objectives. In one embodiment, the event model describes at least one of two general types of events: (1) a workload event, which occurs when a workload requirement for one or more sites moves from a first level to a second level; and (2) a resource event, which occurs when a resource (e.g., a server) fails, transitions into inactive mode, or is reinstated into the system upon recovering from failure or maintenance completion. In general, for a given state, S, there is a set E of events that can potentially occur when the system is in state S. For each workload event e$\in$ E, the probability distribution of the time to the next event e is obtained from the workload model described above. For each resource event, it is assumed that resources fail (and recover) independently, and that the time of failure (and recovery) is exponentially distributed.

The cost model describes the costs of operating the multiple sites within the distributed computing system over an extended period of time. The cost model is thus used to evaluate the effects of the various site-specified policies on the overall distributed computing system. In one embodiment, the cost model describes at least three main costs: (1) a violation cost, VC, that represents the cost of violating a given workload's SLA; (2) a remote resource cost, RRC, that represents the cost of using a remote resource to process a given workload; and (3) a reallocation cost, RC, that represents the initial setup and provisioning cost for a given workload.

In further embodiments, the cost model further describes at least three lower-level cost functions. The first lower-level cost function, $\alpha(S, w)$, describes the violation cost for a workload w when the system is in state S. This violation cost is proportional to num_deficit_servers(S, w), which describes the difference between the resources (e.g., number of servers) required to process the workload w and the resources (local and remote) actually allocated to the workload w. Thus, the violation cost $\alpha(S, w)$ is expressed as a penalty per deficit resource per unit time in the workload's SLA.

The second lower-level cost function, $\gamma(S, w)$, describes the remote resource cost of using a remote resource to process a workload w when the system is in state S. This remote resource cost is proportional to num_borrowed_servers (S, w), which describes the remote resources (e.g., number of servers) borrowed on behalf of the workload w when the system is in state S. In this case, the remote resource cost $\gamma(S, w)$ is expressed as a penalty per remote resource per unit time in the site's policy set. In one embodiment, the remote resource cost $\gamma(S, w)$ distinguishes between resources borrowed from different sites. In this case, the remote resource cost $\gamma(S, w)$ for a borrowed resource depends at least in part on the site from which the resource was borrowed.

The third lower-level cost function, $\beta(S, w)$, describes the reallocation cost for a workload w when the system transitions from state S to state S'. The reallocation cost $\beta(S, w)$ depends at least in part on whether the reallocated resource was idle or running some workload when it was reallocated, on whether the reallocated resource is local or remote with respect to the workload and on the cost of provisioning and setting up the workload.

Figure 3:
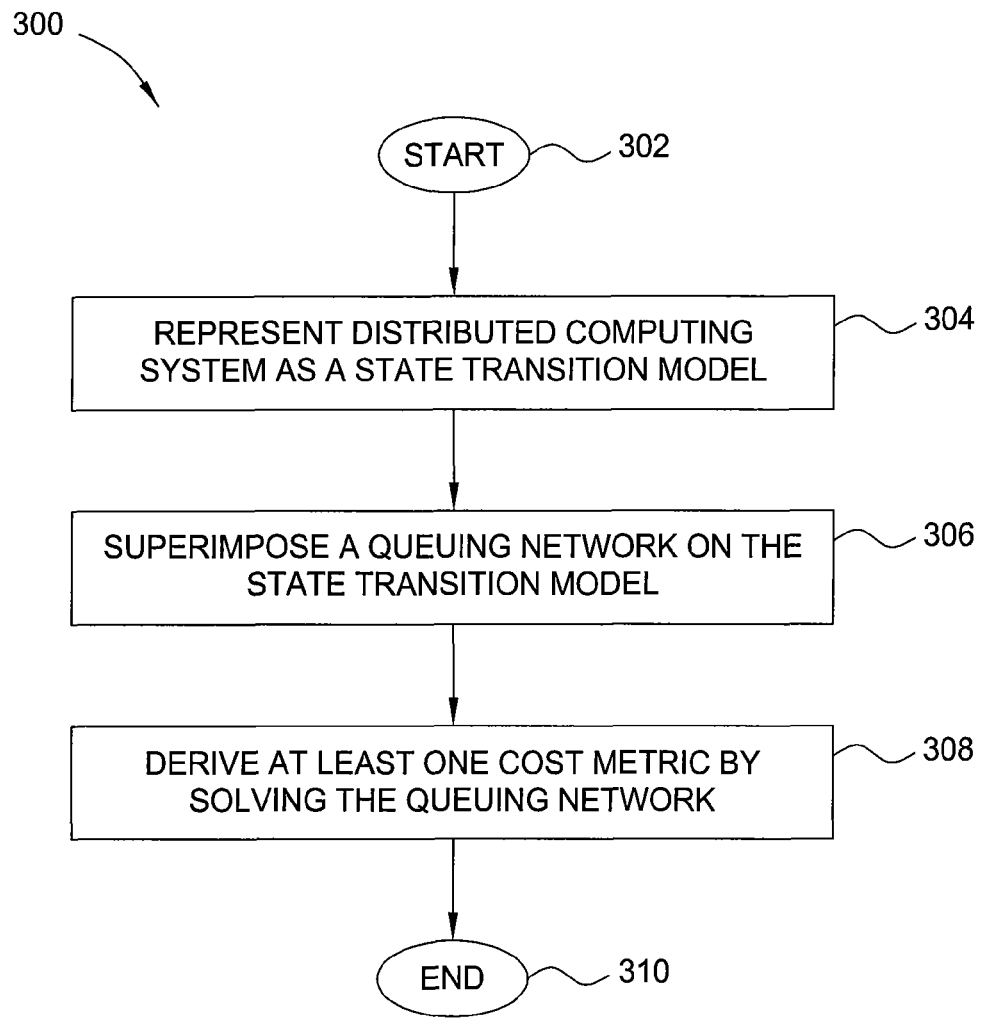
FIG. 3 is a flow diagram illustrating one embodiment of a method for processing the various inputs illustrated in FIG. 2 in order to produce the total costs, according to the present invention.

FIG. 3 is a flow diagram illustrating one embodiment of a method 300 for processing the various inputs 202 illustrated in FIG. 2 in order to produce the total costs 206, according to the present invention. The method 300 may be implemented in, for example, the analysis tool 200.

Figure 4:
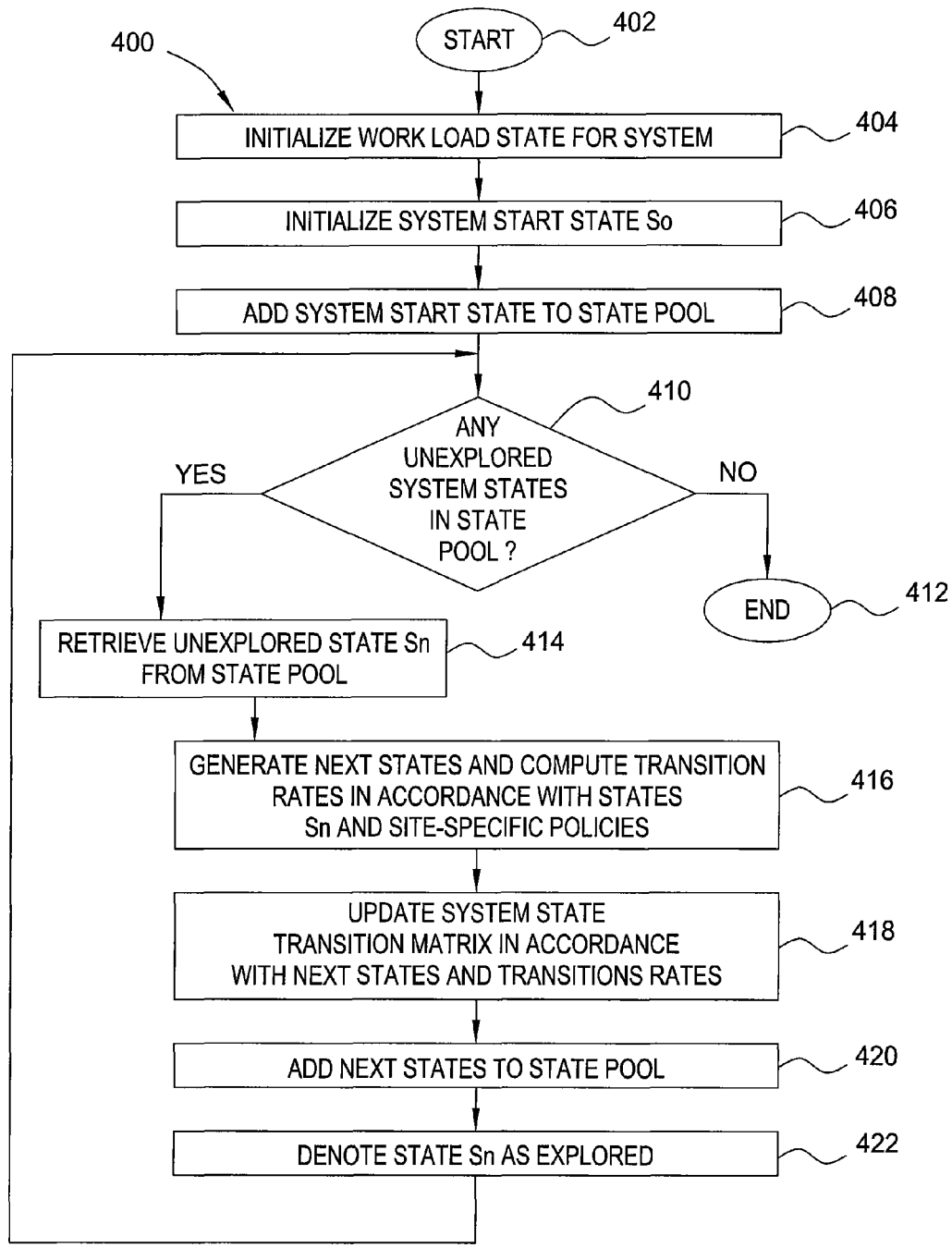
FIG. 4 is a flow diagram illustrating one embodiment of a method for constructing a state transition model, according to the present invention.

The method 300 is initialized at step 302 and proceeds to step 304, where the method 300 represents the analysis of the distributed computing system using a state transition model. In particular, the method 300 represents the status of the distributed computing system at a given time, as a state in the state transition model. In one embodiment, the state transition model is constructed from the various models (described above) associated with the sites included in the distributed computing system. In one embodiment, this includes modeling the resource availability at each site as a state, modeling changes to the resource availability at the site (e.g., due to resource failures, recoveries, borrowings or loans) as a state transition model, and modeling changes to the site's workload as a state transition model. In addition, any policies that apply to the site are modeled as constraints on the site's states and state transitions. FIG. 4, described in greater detail below, illustrates one embodiment of a method for constructing a state transition model in accordance with the site-associated models. In one embodiment, construction of the state transition model includes encoding the individual site policies into the function P(S, e) described above.

Once the state transition model has been constructed, the method 300 proceeds to step 306 and superimposes a queuing network on the state transition model. In one embodiment, superimposing a queuing network on the state transition model involves identifying valid states and state transitions for the distributed computing network. These valid state transitions are then annotated with the probabilities at which they occur (e.g., depending upon the characteristics of the associated workloads and resource failure/recovery characteristics) and the probabilities associated with the policies (e.g., the probabilities of actions associated with the policies, where the actions may involve transitioning the distributed computing network to one or more different states).

In one embodiment, the method 300 superimposes a queuing network model on the state transition model in order to annotate state transitions, T, with their associated probability distribution functions. In accordance with step 306, a transition T:S→eS' is labeled with a tuple <fe, pr>, where the function fe describes the probability distribution of the event e that causes the system to transition from state S to state S'. In one embodiment, the function fe is an appropriate statistical distribution (e.g., an exponential distribution or a Pareto distribution) chosen based on the desired level of accuracy. The probability pr describes the probability that the system transitions from date S to state S' in response to the event e.

In step 308, the method 300 derives at least one cost metric by solving the queuing network (e.g., by solving a Markov chain). In accordance with the present invention, a solution to the queuing network model gives steady state probabilities for various states of the distributed computing system. In one embodiment, the solution to the queuing network model gives pr(S) for all states S and rate(T) for all transitions T, where pr(S) describes the probability (over an extended period of time) that the system is in state S, and rate(T) describes the rate (over an extended period of time) at which the system makes a transition T. In one embodiment, the costs associated with the workloads are derived according to the following (in terms of mean cost units per unit time):

$$VC(w) = \Sigma S \Sigma w \alpha(S, w) * pr(S) \qquad (EQN. 1)$$

$$RRC(w) = \Sigma S \Sigma w \gamma(S, w) * pr(S) \qquad (EQN. 2)$$

$$RC(w) = \Sigma T: S \rightarrow S' \Sigma w \beta(S, S', w) * rate(T) \qquad (EQN. 3)$$

The terms pr(S) and rate(T) can be determined from the queuing network model as follows. In one embodiment, where the workload events e are exponentially distributed, then the stationary probability distribution is calculated using standard analytical techniques to solve a Markov chain. The stationary probability distribution gives pr(S) for all states S. For every transition T:S→eS', $$rate(T) = pr(S) * rate(fe) \qquad (EQN. 4)$$

where rate(fe) describes the rate of the exponential distribution fe.

In an alternative embodiment, where the workload events e follow a heavily-tailed Pareto distribution, a discrete event simulation may be applied to solve the queuing network model. In one embodiment, the simulation is run for a long period of time $t_{sim}$. In one embodiment, $t_{sim}$ represents the amount of time necessary for an application running on the distributed computing system to arrive at a steady state (e.g., approximately 8,000 seconds for some applications). In the course of the simulation, the amount of time expended by the system in any state S by t(S) is measured, and this expended time is used to calculate pr(S) such that $$pr(S) = t(S)/T_{sim} \qquad (EQN. 5)$$

Similarly, the number of times that the system transitions from state S to state S' is measured using a transition T by n(T), such that rate(T) may be estimated as:

$$rate(T) = n(T)/t_{sim} \qquad (EQN. 6)$$

Given pr(S) for all states S and rate(T) for all transitions T, the workload costs can be estimated as discussed above with respect to EQNs. 1, 2 and 3.

Additional metrics of distributed computing performance (e.g., response time, throughput, resource availability, etc.) may also be computed as functions of the queuing network solution. Thus, the metrics produced by the method 300 may then be reviewed by a user in order to determine whether the current policy set P for the distributed computing system enables the distributed computing system to process workloads in a satisfactory manner. The method 300 then terminates in step 310.

The method 300 thereby facilitates the efficient analysis of the effects of various resource sharing policies, applicable to the individual sites, on the overall distributed computing system including the sites. By using a state transition model, and then applying the given policies to identify valid distributed computing states and state transitions, the costs and performance impact of the given policies on the distributed computing system can quickly be identified and presented in a form for easy analysis.

FIG. 4 is a flow diagram illustrating one embodiment of a method 400 for constructing a state transition model based on the site-associated models described above, according to the present invention. The method 400 may be implemented, for example, in accordance with step 304 of the method 300.

The method 400 is initialized at step 402 and proceeds to step 404, where the method 400 initializes the workload state for the distributed computing system, in accordance with the set E of all events and the collective policy set P of all site policies for sites in the distributed computing system.

In step 406, the method 400 initializes the system start state, $S_0$. The method 400 then adds the system start state $S_0$ to a state pool. The state pool comprises one or more states of the distributed computing system that are derived by the method 400.

In step 410, the method 400 determines whether there are any unexplored system states in the state pool. In one embodiment, a system state is unexplored if no potential next states and corresponding transition rates have been determined for the system state. If the method 400 determines that no unexplored system states remain in the state pool, the method 400 terminates in step 412. Termination of the method 400 indicates that the state transition model is established and can be implemented in conjunction with the method 300, as discussed above with respect to FIG. 3.

Alternatively, if the method 400 determines that one or more unexplored system states still remain in the state pool, the method 400 proceeds to step 414 and retrieves an unexplored state $S_n$ from the state pool. The method 400 then proceeds to step 416b and generates next states and corresponding transition rates associated with the retrieved state $S_n$, if any such next states are associated with the retrieved state $S_n$. In one embodiment, generation of the next states and corresponding transition rates is performed in accordance with the state $S_n$ and the site-specific policies in the policy set P.

In step 418, the method 400 updates a state transition matrix for the distributed computing system in accordance with the next states and the corresponding transition rates generated in step 416. These next states are then added to the state pool in step 420.

In step 422, the method 400 denotes the retrieved state $S_n$ as explored. The method 400 then returns to step 410 and proceeds as described above in order to explore any remaining unexplored states in the state pool. Steps 410-422 may be repeated as many times as is necessary until all states in the state pool have been explored and no new states can be added to the state pool. Those skilled in the art will appreciate that step 412 will not be repeated and will only occur once no new states can be added to the state pool.

Figure 5:
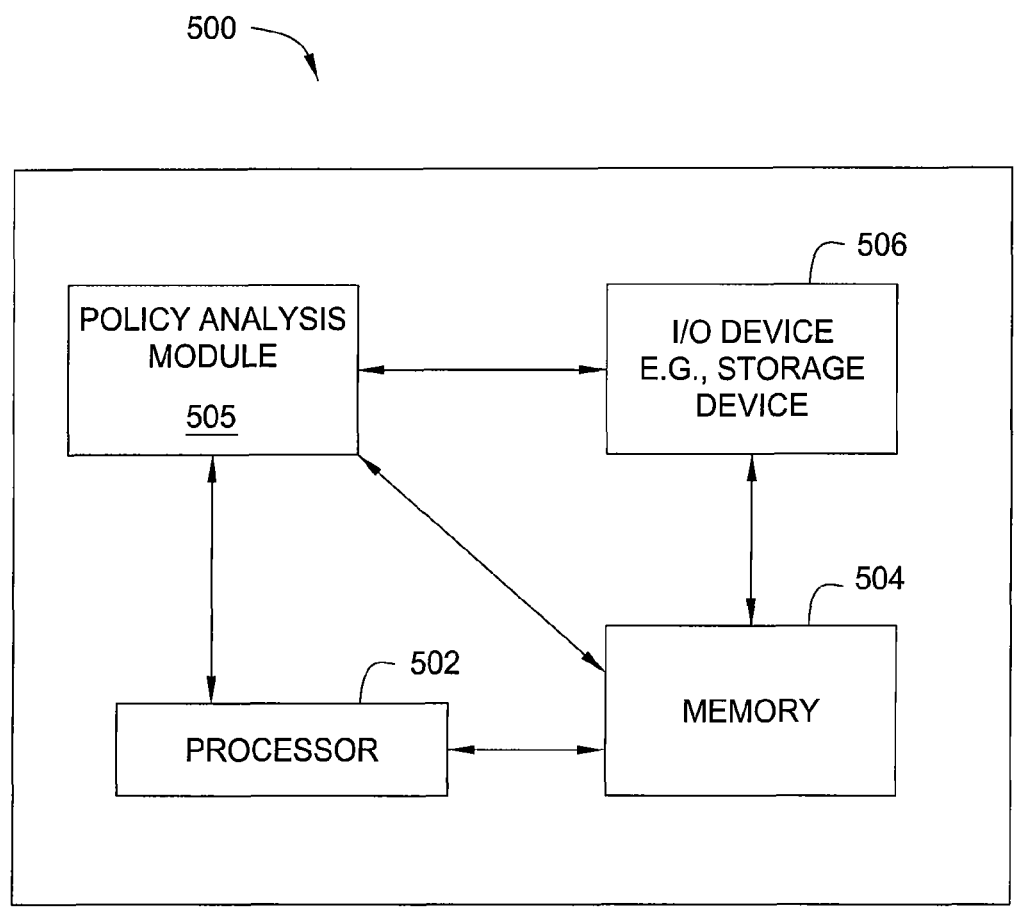
FIG. 5 is a high level block diagram of the policy analysis method that is implemented using a general purpose computing device.

FIG. 5 is a high level block diagram of the policy analysis method that is implemented using a general purpose computing device 500. In one embodiment, a general purpose computing device 500 comprises a processor 502, a memory 504, a policy analysis module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the policy analysis module 505 can be implemented as a physical device or subsystem that is coupled to a processor through a communication channel.

Alternatively, the policy analysis module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the policy analysis module 505 for analyzing the performance and policies associated with a distributed computing system described herein with reference to the preceding Figures can be stored on a computer readable medium or carrier (e.g., RAM, magnetic or optical drive or diskette, and the like).

Thus, the present invention represents a significant advancement in the field of distributed computing systems analysis. A method and apparatus are provided that make it possible to efficiently analyze of the effects of various resource sharing policies, applicable to the individual sites, on the overall distributed computing system including the sites. By modeling state transitions as a state transition model, and then applying the given policies to identify valid distributed computing states and state transitions, the costs and performance impact of the given policies on the distributed computing system can quickly be identified and presented using queuing network analysis.

While foregoing is directed to the preferred embodiment of the present invention, other and further embodiments of the invention may be devised without departing from the basic scope thereof, and the scope thereof is determined by the claims that follow.

The invention claimed is:

1. A method for analyzing one or more policies applicable to a plurality of computing sites that host respective applications and process respective workloads in a distributed computing network, said method comprising:

representing said distributed computing network, in its entirety, as a state transition model, wherein said state transition model is constructed in accordance with at least one model representing characteristics of said plurality of computing sites, where said at least one model includes at least one of: a site model, a workload model, a workload state model, a site state model, a policy model, an event model, or a cost model, and wherein said representing comprises:

modeling, at a computing site, an availability of one or more associated resources as a state;

modeling, at said computing site, one or more changes to an associated workload and one or more changes to said availability of said one or more associated resources as state transitions; and modeling one or more policies that dictate a manner in which said computing site shares resources with a second computing site as constraints on said state and on said state transitions;

superimposing a queuing network model on said state transition model, wherein said superimposing said queuing network comprises:

associating the state transition representing said one or more changes to an associated workload with a first probability that depends upon characteristics of said associated workload;

associating the state transition representing said one or more changes to an availability of said one or more associated resources with a second probability that depends upon characteristics of failure and recovery of said one or more associated resources;

associating said first probability and said second probability with respective policies;

associating each of said respective policies with a third probability that depends upon at least one action to be taken in accordance with a respective policy; and deriving at least one steady state probability of at least one state of said distributed computing network in accordance with a queuing network analysis technique; and identifying an effect of said one or more policies on a performance of said distributed computing network in accordance with a solution to said queuing network model, wherein at least one of: the representing, the superimposing, or the identifying is performed using a processor.

2. The method of claim 1, wherein said site model represents one or more static parameters associated with a corresponding computing site.

3. The method of claim 2, wherein said one or more static parameters comprise at least one of: a number of resources associated with said corresponding computing site, a type of said resources, or one or more policies dictating a manner in which said corresponding computing site may share resources with a second computing site.

4. The method of claim 1, wherein said workload model represents at least one of: one or more applications hosted by a corresponding computing site, one or more service level agreements provided by said corresponding computing site, or a transition probability matrix specifying how a workload processed by said corresponding computing site transitions between two or more levels associated with respective quantities of resources needed to process said workload.

5. The method of claim 1, wherein said workload state model represents at least one of: a current workload level associated with a corresponding computing site, where said current workload level indicates a quantity of resources needed to process a workload, a quantity of local resources associated with said corresponding computing site that are currently serving said workload, or an array denoting one or more resources borrowed from a second computing site on behalf of said workload.

6. The method of claim 1, wherein said site state model represents one or more time-varying parameters associated with a corresponding computing site.

7. The method of claim 6, wherein said one or more time-varying parameters comprises at least one of: a workload state associated with said corresponding computing site, a quantity of resources loaned by said corresponding computing site to a second computing site, or a quantity of resources associated with said corresponding computing site that are not in maintenance mode.

8. The method of claim 1, wherein said policy model represents one or more ways in which said distributed computing network may respond to system events.

9. The method of claim 8, wherein said policy model describes one or more potential states to which said distributed computing network may transition in response to a specified external event that occurs while said distributed computing network is in a given state.

10. The method of claim 1, wherein said event model represents one or more events that trigger a state change in said distributed computing network.

11. The method of claim 10, wherein said state change causes said distributed computing network to reallocate one or more resources among two or more workloads associated with one or more of said computing sites.

12. The method of claim 1, wherein said cost model represents one or more costs of operating said distributed computing network over an extended period of time.

13. The method of claim 12, wherein said one or more costs comprises at least one of: a cost associated with a violation of a service level agreement associated with a given workload processed by said distributed computing network, a cost associated with borrowing a resource from a remote computing site to process a given workload, or a cost associated with an initial setup and provisioning for a workload at a remote computing site.

14. The method of claim 1, wherein said identifying comprises:

applying at least one cost model to said at least one steady state probability; and calculating at least one metric associated with a performance of said distributed computing network as at least one function of said at least one steady state probability.

15. The method of claim 14, wherein said at least one metric comprises at least one of: a response time associated with said distributed computing network, a throughput associated with said distributed computing network, or a resource availability associated with said distributed computing network.

16. A computer non-transitory readable storage device containing an executable program for analyzing one or more policies applicable to a plurality of computing sites that host respective applications and process respective workloads in a distributed computing network, where the program performs steps of:

representing said distributed computing network, in its entirety, as a state transition model, wherein said state transition model is constructed in accordance with at least one model representing characteristics of said plurality of computing sites, where said at least one model includes at least one of: a site model, a workload model, a workload state model, a site state model, a policy model, an event model, or a cost model, and wherein said representing comprises:

modeling, at a computing site, an availability of one or more associated resources as a state;

modeling, at said computing site, one or more changes to an associated workload and one or more changes to said availability of said one or more associated resources as state transitions; and modeling one or more policies that dictate a manner in which said computing site shares resources with a second computing site as constraints on said state and on said state transitions;

superimposing a queuing network model on said state transition model, wherein said superimposing said queuing network comprises:

associating the state transition representing said one or more changes to an associated workload with a first probability that depends upon characteristics of said associated workload;

associating the state transition representing said one or more changes to an availability of said one or more associated resources with a second probability that depends upon characteristics of failure and recovery of said one or more associated resources;

associating said first probability and said second probability with respective policies;

associating each of said respective policies with a third probability that depends upon at least one action to be taken in accordance with a respective policy; and deriving at least one steady state probability of at least one state of said distributed computing network in accordance with a queuing network analysis technique; and identifying an effect of said one or more policies on a performance of said distributed computing network in accordance with a solution to said queuing network model.

* * * * *